United States Patent [19]

Emmerson

[11] Patent Number: 5,769,336
[45] Date of Patent: Jun. 23, 1998

[54] ENVIRONMENTALLY-SAFE APPARATUS FOR DISPOSING OF LIGHT BULBS

[75] Inventor: Dana Emmerson, Dartmouth, Canada

[73] Assignee: Environmental Disposal Concepts Incorporated, Nova Scotia, Canada

[21] Appl. No.: 763,075

[22] Filed: Dec. 10, 1996

Related U.S. Application Data

[63] Continuation-in-part of Ser. No. 563,531, Nov. 6, 1995, Pat. No. 5,660,338.

[30] Foreign Application Priority Data

Jun. 3, 1996 [CA] Canada .................................. 2178045

[51] Int. Cl.$^6$ .................................................. B02C 19/14
[52] U.S. Cl. .............................. 241/36; 241/99; 241/100
[58] Field of Search ...................... 241/99, 100, DIG. 38, 241/DIG. 14, 36, 37.5

[56] References Cited

U.S. PATENT DOCUMENTS

| 2,593,657 | 4/1952 | Coon et al. . |
|---|---|---|
| 2,620,988 | 12/1952 | Tellier . |
| 2,866,604 | 12/1958 | Hall . |
| 3,623,672 | 11/1971 | De Frank . |
| 3,913,849 | 10/1975 | Atanasoff et al. . |
| 4,579,287 | 4/1986 | Brown . |
| 4,607,798 | 8/1986 | Odlin . |
| 4,655,404 | 4/1987 | Deklerow . |
| 4,875,630 | 10/1989 | Carlson . |
| 4,971,261 | 11/1990 | Solomons . |
| 5,042,724 | 8/1991 | Perry . |
| 5,092,527 | 3/1992 | Perry . |
| 5,106,598 | 4/1992 | Cogar . |
| 5,188,500 | 2/1993 | Eide et al. . |
| 5,205,497 | 4/1993 | Deklerow . |
| 5,360,169 | 11/1994 | Kohler . |
| 5,375,774 | 12/1994 | Perry . |
| 5,388,773 | 2/1995 | Perry . |
| 5,395,056 | 3/1995 | Perry . |
| 5,575,429 | 11/1996 | Muller-Girard ........................... 241/99 |
| 5,586,730 | 12/1996 | Mortrud .................................... 241/99 |

FOREIGN PATENT DOCUMENTS

| 834712 | 2/1970 | Canada . |
|---|---|---|
| 934349 | 9/1973 | Canada . |
| 1015727 | 8/1977 | Canada . |
| 1161813 | 2/1984 | Canada . |
| 1185946 | 4/1985 | Canada . |
| 1215959 | 12/1986 | Canada . |
| 1293234 | 12/1991 | Canada . |
| 2116231 | 2/1993 | Canada . |
| 2133632 | 2/1993 | Canada . |
| 1316891 | 4/1993 | Canada . |
| 2086085 | 2/1994 | Canada . |
| 696751 | 8/1940 | Germany . |

*Primary Examiner*—Mark Rosenbaum
*Attorney, Agent, or Firm*—D. Peter Hochberg; Mark Kusner

[57] ABSTRACT

A portable unitary apparatus is provided herein for disposing of hazardous light bulbs, e.g., fluorescent bulbs. The apparatus includes an open-topped, multi-compartmented container of circular cylindrical cross-section, having three compartments and a hinged covering lid. The lower surface of the lid is connected to a reduction chamber, having an axial inlet means for a bulb to be pulverized and an axial outlet leading directly to the collection compartment. A rigid unitary pulverizing blade is secured to the drive shaft of an electric motor. A light bulb feed chute extends through the lid, and extends from above the lid to the reduction chamber. A disposable pulverized light bulb collection bag is selectively-disposed within the collection compartment in air-sealed relationship to the axial outlet means of the reduction chamber. A vacuum motor is operatively-disposed within the lower exhaust chamber. The vacuum motor has an axial inlet at sub-atmospheric pressure to draw gases and particulates from the collection compartment and to expel them. The vacuum motor expels gases into the exhaust compartment at an overpressure.

15 Claims, 2 Drawing Sheets

ENVIRONMENTALLY-SAFE APPARATUS FOR DISPOSING OF LIGHT BULBS

RELATED APPLICATION

This application is a continuation-in-part of application Ser. No. 08/563,531 filed Nov. 6, 1995, now U.S. Pat. No. 5,660,338, patented Aug. 26, 1997.

BACKGROUND OF THE INVENTION (i). Field of the Invention

This invention relates to an apparatus for disintegrating light bulbs, more particularly fluorescent lamps, and for simultaneously providing a holding unit to contain such disintegrated fluorescent lamps in an environmentally-safe manner.

(ii). Description of the Prior Art

Fluorescent lamps are mercury-vapour electric-discharge lamps, in which the inside of the bulb or tube is coated with fluorescent material so that ultra-violet radiation from the discharge is converted to light of an acceptable colour. Such lamps take advantage of fluorescence, which is the production of visible light (white or coloured) or other radiation by a substance as the result of exposure to, and absorption of, other radiations of different wave length, such as ultraviolet light, or electric discharge in a vacuum tube. Those substances having this property are known as phosphors, the term usually being restricted to those solids that absorb ultraviolet and emit visible light. In ordinary fluorescent lighting, the tube contains mercury vapour and argon, and the inside walls of the tube are coated with the fluorescent substance, often a zinc or cadmium compound. The passage of an electric current through the mercury vapour-argon mixture produces invisible ultraviolet light which is absorbed by the phosphor and re-emitted as visible light. The whole process occurs at a relatively low temperature (hence called a "cold light" process).

Among the numerous substances which are known to exhibit phenomenon of fluorescence may be mentioned fluorite, uranium glass, petroleum, solutions of certain organic dyestuffs, eosin, fluorescein, quinine sulphate chlorophyll, and the vapour of sodium, mercury, iodine, and acetone.

Because of the contents of such fluorescent lamps, their disposal brings about environmental concerns, particularly where such fluorescent tubes are commonly disposed of with the everyday trash. It would therefore be desirable to provide a system for safely disintegrating such fluorescent lamps.

Various patented arrangements have been proposed for breaking up fluorescent tubes, bottles or the like into small pieces. Most of these however, particularly the arrangements therein for preventing escape of phosphorus and mercury which are present in fluorescent tubes, are complicated, requiring complex mechanisms for their operation.

U.S. Pat. No. 3,623,672 patented November 1971 by W. de Frank purported to provide an apparatus for breaking up and disposing of burned-out and defective glass fluorescent lamp bulb tubes. That fluorescent tube disposing apparatus was entirely mounted on a lid of a mating, open-top, standard 20-gallon trash can. The patented disposal apparatus included an inlet chute to receive the fluorescent tubes, and a motor mounted underneath the lid for rotating a tube-breaking chain. A stop was positioned a predetermined distance below the outlet end of the inlet chute to hold a fluorescent tube in a position where it can be acted upon by the rotating breaking means. The means for breaking the fluorescent tube was a breaker chain which included metal chain links provided with terminal metal washers connected by connectors to the motor driving shaft so that it assumed a bulb-breaking orientation by centrifugal force. As the tube was broken, it automatically fed itself into the can. The inlet chute included a telescoping protective tube substantially entirely to enclose the fluorescent tube. A safety switch was also included, which prevented the motor from being energized unless the telescoping protective tube was raised or lifted to its upwardly extended position.

U.S. Pat. No. 3,913,849 patented Oct. 31, 1975 by I. M. Atanasoff et al purported to provide a tube digester which served to prevent the escape of phosphorus and mercury vapours without requiring the provision of pumps for either pressure or suction. That tube digester was formed of a container in the shape of a funnel having an open bottom, which was adapted to be inserted in a bunghole in a storage drum. A tube for receiving fluorescent tubes opened into the container at one side. Within the container was a rotating blade which passed beneath the opening of the tube for breaking up fluorescent tubes. The axis of the tube was arranged in a plane which was tangential with respect to the axis of rotation of the blade. The tube sloped downwardly in the direction of rotation of the blade. The blade had a rearwardly and downwardly sloping surface for creating a downward draft of air within the funnel to prevent phosphorus and mercury vapours from escaping outward. A slightly downwardly sloping shelf was arranged beneath the tube and below the plane of rotation of the blade, by a distance at least equal to the length of the terminal prongs of a fluorescent tube. The leading edge of the blade formed an acute angle with the radius drawn from the axis of rotation to the top of the leading edge. To provide a crushing action, the blade cooperated with a lower abutment shelf.

U.S. Pat. No. 4,579,287 patented Apr. 1, 1980 by W. E. Brown purported to provide apparatus for breaking up and disposing of burned-out glass fluorescent lamp bulb tubes. Such apparatus utilized rapidly paired rotating chains which assumed a bulb-breaking orientation by centrifugal force to pulverize the tubes. The pulverizing mechanism was confined within an open-top container and was suspended from a lid that covered the top of the container. The pulverized debris collected within the container. A plastic bag was optionally provided to line the interior of the container to facilitate disposal of the pulverized debris. A safety electrical switch was associated with the lid in a manner to prevent rotation of the chains if the lid was not properly sealed upon the top of the container. The bulb crushing mechanism is described as being paired chains which were attached to a vertical shaft so that the mechanism assumed a bulb-breaking orientation by centrifugal force.

U.S. Pat. No. 4,655,404 patented Apr. 7, 1987 by J. W. Deklerow disclosed a fluorescent lamp crusher device which included a replaceable filter cartridge for capturing or otherwise removing mercury vapours which were released upon the crushing of fluorescent lamps. That crusher comprised a cylindrical crusher housing mounted on a carriage above a removable waste bucket, which communicated with a funnel-shaped discharge formed in the lower end of the housing. The top of the housing was sealed by a cover which had a lamp inlet opening and an exhaust opening. The shaft of an electric motor extended into the housing and had a breaking means which was a metal plate secured to the shaft of a motor and which was provided with two hooks to hold rectangular-shaped bars/flails to the metal plate, so that it assumed a bulb-breaking orientation by centrifugal force. The flails, adjacent the inlet opening, rotated at high speeds to strike and crush lamps entering the housing. The exhaust opening was connected by a duct to a filter cartridge which was removably-mounted on the exterior of the crusher housing above an exhaust fan. The cartridge contained a porous filter bag, which was removably-attached to the exhaust duct, and an activated charcoal filter element, which was positioned in the cartridge beneath the bag and was in communication with the fan inlet. The exhaust fan operated simultaneously with the crusher motor to develop a vacuum which served to draw exhaust air from within the housing successively through the filter bag and the charcoal filter element. The filter element was specially treated to remove mercury vapour from the exhaust air that passed through the element.

U.S. Pat. No. 5,205,497 patented Apr. 27, 1993 by J. W. Deklerow and its corresponding Canadian Patent Application No. 2,086,085, purported to provide a lamp crusher. The lamp crusher housing was mounted on the removable cover of a replaceable waste container to discharge crushed lamps into the waste container through an opening in the cover. An elongate, plastic sleeve was removably and sealingly-secured at one end over the upper end of the waste container, and at its opposite end around the outlet of the housing from which crushed lamp particles were discharged. The sleeve had an excess portion folded into the waste container so that when the cover was lifted from the container, opposite ends of the sleeve bag remained sealingly connected to the waste container and housing outlet so that no toxic gases were allowed accidentally to escape into their surrounding atmosphere. The apparatus included a replaceable filter cartridge for filtering out mercury vapours, and the like. Each cartridge contained a fuse which was connected in the circuit that controlled the motor that drove the lamp crusher. When a new cartridge was placed in the apparatus its fuse was connected into the control circuit and permitted only a predetermined number of lamp crushing operations to occur. After such finite number of operations the motor was prevented from further operation until the saturated cartridge was replaced by a new, clean cartridge. The crusher element included a cylindrical bar or flail which was connected to the shaft of the motor, so that it assumed a bulb-breaking orientation by centrifugal force.

U.S. Pat. No. 2,593,657 patented Apr. 22, 1952 by A. J. Coon et al, provided an air swept cushion for fluorescent light tubes. The patented device included a frame structure and a casing supported on the frame structure. The casing included an exhaust chamber and a reduction chamber positioned below the exhaust chamber, the reduction chamber having an opening in communication with the exhaust chamber. A longitudinally-extending opening was formed at the upper end of the casing and was in communication with the exhaust chamber. A hinged closure member was provided over the opening. A table was positioned within the exhaust chamber adjacent to the opening, the table extending downwardly in inclined relation toward the reduction chamber. A crushing mechanism was provided in the reduction chamber, the crushing mechanism including a stationary anvil plate extending within the reduction chamber and having a vertical impact surface, a hammer substantially coextensive with the anvil, and means pivotally-connecting the hammer to the casing for movement about a horizontal axis, so that the hammer was movable relative to the surface of the anvil for reducing tubes entering into the reduction chamber. The blower unit was constructed and arranged to remove dust placed in suspension within the device incidental to the reduction of the light tubes from the reduction chamber and the exhaust chamber through the conduit. The bulb crushing mechanism was described as a converging reductor chamber including a powered compressing reduction mechanism including an anvil plate.

U.S. Pat. No. 2,620,988 patented Dec. 9, 1952 by E. H. Tellier provided a fluorescent lamp bulb breaking device. This disposal device included a breaker for the tubes comprising a breaker casing, breaker elements in the casing, a feed-in opening in the casing, and a magazine supported in an upright position on top of the casing which encloses a carton with a closed upper end and an open lower end. A discharge opening was provided in the lower end of the magazine, the discharge opening in the lower of the carton registering with the opening in the end of the magazine, the opening in the magazine communicated with the feed-in opening in the breaker casing. A reciprocating closure was provided for the openings. Means were provided for uninterruptedly opening the closure from a closed position to an open position. A discharge opening was provided from the breaker casing. Finally, means were provided for spraying water into the breaker chamber. The bulb crushing mechanism was described as a star-shaped rotatable wheel.

U.S. Pat. No. 2,866,604 patented Dec. 30, 1958 by J. B. Hall provided a deactivating lamp disposal device. The device was provided with means for absorbing and disposing of the gas contained in the tube. The device included a frame and a removable water pan, the water pan being slidably-mounted within the frame, and having a plurality of drain holes adjacent its bottom surface. The frame was provided with a top support plate, the support plate having an aperture. A material-breaking member was mounted within a housing, the breaking member including a rotatable star-shaped wheel. The housing was mounted on the support and had a bottom opening and a side opening, the bottom opening communicating with the aperture in the plate. A tubular member was provided with an opening in its side. A hose was connected with a water source, the hose communicating with side openings in the tubular member, the water flowing freely through the tubular member into the housing and through the drain holes. A motor was secured to the top support plate and was arranged to actuate the breaker wheel. The bulb crushing mechanism was described as a rotatable breaker having breaker arms so that it assumed a bulb-breaking orientation by centrifugal force.

U.S. Pat. No. 4,607,798 patented Aug. 26, 1986 by K. Odlin, provided a lamp crushing machine. The machine included a casing which was divided into upper, central and lower zones. Lamps which were to be disposed of were loaded into the upper zone. A horizontally-mounted drum with a number of radial vanes and possibly also circumferential vanes was disposed in the central zone. When this drum was rotated, the lamps were progressively broken by the shearing action of the vanes as they passed close by the edges of walls which project inwardly from the casing. Unbreakable parts, such as lamp and caps were carried around the drum in pockets arranged between the vanes. The debris fell into a hopper in the lower zone, which can be removed and emptied periodically. Throughout operation of the machine, the lamps were doused by water issuing from a nozzle to quench any igniting sodium. Dangerous vapours passed out through special vents, and other contaminants were filtered out of the water draining from the machine. The drum can be rotated manually by means of a handle but is preferably rotated rapidly by an electrical motor. The bulb crushing mechanism was described as a horizontally-mounted rotatable drum with radial vanes and circumferential vanes.

U.S. Pat. No. 4,971,261 patented Nov. 20, 1990 by C. Solomons, provided a medical waste fragmentation and disposal system. The fragmentation device included a chamber having a rotating blade for fragmenting medical waste, such as needles, syringes, vials and extracted teeth. The blade, with minimal clearance, passed between a U-shaped stationary member. During operation, the U-shaped member served momentarily to hold the items to be fragmented in a stationary position as the blade fragmented it in a shearing-type action. An agitating member continually threw the fragments into the path of the rotating blade. After the fragmentation was completed to the requisite size, the fragmented particles were drawn by centripetal force through the disposal chute into a removable and disposable receptacle having a sterilization or germicidal solution contained therein. The disposable receptacle, with sanitized waste, can thereafter be safely and legally thrown away as ordinary trash. The crushing mechanism is described as a rotating blade cooperating with a U-shaped holder member.

U.S. Pat. No. 5,042,724 patented Aug. 27, 1991 by T. J. Perry provides a fluorescent tube crusher with particulate separation and recovery. The patented digesting system included mechanism wherein the fluorescent tubes were fractured with a rotating fracture blade while stripping air was passed through the fracture zone and the fractured glass was then passed countercurrently through a countercurrent flow zone with a rapid flow of stripping air. As the fractured glass particulates descended through the countercurrent flow stripping gas zone, they impacted upon a plurality of baffles or impact surfaces that jarred the particulates separating additional small powder particulates from the surface of the glass particles. The small dust or powder particulates separated from the glass by the air stream and the jarring surfaces were then separated from the air stream by a sequence including an initial cyclone from which particulate material collected was removed during continued operation, and by a subsequent fine filter and a final activated carbon filter to remove metallic vapours. The bulb crushing mechanism is described as a rotating blade cooperating with the side walls of fracture chamber.

U.S. Pat. No. 5,092,527 patented Mar. 3, 1992 by T. J. Perry et al, provided a fluorescent tube crusher with particulate separation and recovery. The patented digesting system included means for breaking up fluorescent tubes with a rotating fracture blade while passing a critical amount of stripping air through the fracture zone and countercurrently through a countercurrent flow zone with the fractured glass. The small dust and powder particulates separated from the glass by the countercurrent air stream were then separated from the air stream by a sequence including an initial cyclone from which particulate material collected was removed during continued operation, and by a subsequent fine filter and a final activated carbon filter to remove metallic vapours. The bulb crushing mechanism is described as a rotating blade cooperating with the side walls of the fracture chamber.

U.S. Pat. No. 5,106,598 patented Apr. 21, 1992 by M. J. Cogar, provided a lamp reclamation process. The patented system included the removal of the lamp ends and the washing of the lamp envelopes, or crushed lamp envelopes, with wash water to remove mercury and phosphors therefrom. The wash water was then screened to remove glass fragments, and phosphors and mercury present were removed therefrom by decantation and centrifugation. The residual wash water was thereafter treated with a reducing agent to precipitate remaining mercury, and the precipitate was eliminated by decantation and filtration. Additional mercury and cadmium present in the wash water was thereafter removed by treatment with a cationic exchange resin, and the wash water was recycled along with the other water streams produced during the processing. The bulb crushing mechanism is described as rotating star-shaped blades, and the patent includes the essential feature of wash water to flush away chemicals.

U.S. Pat. No. 5,360,169 patented Nov. 1, 1994 by A. Kohler, provided a process and apparatus for the disposal of articles containing metals or metal vapours. The articles were fed into a container containing a liquid which converted the metal or metal vapour into harmless compounds. In the container, the articles were pushed into the liquid and then destroyed under the liquid, releasing the metal or metal vapour, the liquid acting as a protective layer and ensuring that the metal or metal vapour was trapped immediately. The container was emptied at intervals and the contents transferred to a central processing plant. The bulb crushing mechanism is described as a crushing plate manually-actuated by crank and the patent includes the essential feature of liquid in the container to flush away chemicals.

U.S. Pat. No. 5,375,774 patented Dec. 27, 1994 by T. J. Perry, provided a tip separator and method of operation for fluorescent tube digester. In the patented device, a grizzly-type separator was disposed across the path of fractured glass particulates to separate electrical tips from the glass particulates. The separator was formed from round separator bars of twice the average maximum diameter of fractured glass and equal to the maximum average diameter of the fractured glass particulates. The separator bars were discontinuous in the centre to cause a change in orientation of objects moving down the bars and were secured together by cross-bars spaced significantly from the separator bars. The bulb crushing mechanism was described as a rotating blade cooperating with the side walls of the fracture chamber.

U.S. Pat. No. 5,388,773 patented Feb. 14, 1995 by T. J. Perry provided a crushed fluorescent tube particulate separation and recovery method and apparatus. In the patented system, the separation of potentially toxic phosphor compounds from fractured glass particulates derived from crushing used fluorescent light tubes was said to be improved by continuously mixing the fractured glass particulates together in surface contact with each other to abrade the toxic phosphors from the surfaces of the glass particulates followed by separation by air stripping of the small phosphor particles from the fractured glass particulates. The stripping was done in a separate stripping chamber. The mixing and abrading were accomplished in a variety of mixing devices including auger-type apparatus, rotary chambers, fluosolids reactors and others. The bulb crushing mechanism is described as a rotating blade cooperating with the side walls of the fracture chamber.

U.S. Pat. No. 5,395,056 patented Mar. 7, 1995 by T. J. Perry, provided an fracture blade and method of operation for fluorescent tube digester. In the patented device, the uniformity and suitability of fractural glass derived from breaking used fluorescent tubes for separation of the glass and potentially toxic powder adhered to the fractured glass prior to disposal and recovery of the components glass and powder was said to be improved by use of a fracture blade having a sharp striking point extending forwardly from a base composed of a flat transversely-oriented rotatable striking blade. The blade was operated at a striking blade speed of 1760 to 3700 feet per minute, providing a uniformity and size of fractured glass upon which a significantly more effective countercurrent air separation can be made. The bulb crusher blade was a fracture blade which had a flat central portion and two striking blades which are perpendicular to the flat portion. Preferably, the blade included an upstanding sharp tip on the paddle blade.

Canadian Patent No. 1,185,946 issued 85-04-23 to D. F. Green, provided a shredding machine. The patented shredding machine included a housing with a lower shredding chamber located in an upper part of the housing, the lower chamber being provided with a discharge port communicating with a discharge duct from the housing. An upwardly extending trunk was mounted on the housing, the lower portion of which formed an upper shredding chamber which communicated with the lower shredding chamber. A feed hopper was located on the free end of the trunk and had a restricted inlet to the trunk which was spaced from the upper shredding chamber. Power means were supported in the housing with the output shaft thereof extending into the lower shredding chamber. Upper and lower cutting means were fixed to the output shaft, the upper cutting means being adapted for rotating in the upper shredding chamber and the lower cutting means being adapted for rotation in the lower shredding chamber. The lower cutting means was supported on a disc which was fixed to the output shaft of the motor, the disc having spaced diametrically-opposed slots therein. The lower cutting means comprised a body portion with four arms extending therefrom and constituting cutting blades, the body portion having a centrally-dispersed bore therethrough with diametrically-opposed slots positioned either side of the bore, the slots in the body member being adapted to register with the slots in the disc. The upper cutting means comprised a substantially "U"-shaped member having a bight portion with the limbs of the "U"-shaped upstanding therefrom and diverging from each other. A bore in the bight portion was adapted to register with the bore in the body member. A saddle clamp was positioned across the bight portion and had tongues which passed through the slots in the bight portion and engaged in the slots in the body member. The saddle clamp had a bore therethrough to receive a bolt engaged in a bore in the end of the output shaft so that the upper and lower cutting members were secured to the output shaft. A feed duct in the trunk extended through the upper shredding chamber and terminated above the lower shredding chamber. That portion of the feed duct in the shredding chamber constituted a shear plate which co-operated with the upper cutting means to reduce material fed to the upper shredding chamber. The bulb crushing blade is described as a lower cutting means which includes four sharpened radial blades, and an upper cutting means which includes "U"-shaped, bight and two sharpened blades.

Canadian Patent No. 1,215,959 issued 86-12-30 to J. Mordstein et al, provided a device for chopping up garden waste. The patented device included a generally uncovered, level base place with legs fixed at top ends thereof to the base plate. A support disk was adapted to turn about an upright axis, the disk being placed under the base plate and having at least one slot therein. At least one knife was fixed on the disk and was placed to the back of the slot in the direction of turning of the disk. The knife had a cutting edge which was placed at a higher level than a top face of the disk. An electric motor with a drive shaft was provided for driving the disk. The base plate functioned as a support frame for the device and had a downward reinforcing skirt. A filling passageway was supported on top of the base plate next to the motor that was also supported on the plate. An upright and downwardly-open ejection passageway was fixed on a lower side of the base plate and was coaxially-placed around the disk that was fixed on the motor drive shaft. The ejection passageway was disposed around the disk with a clearance therebetween sufficient to guard against stoppages of the device, and a rim extends upwards from an outer edge of the disk. The shredding device was an impeller with three identical knives fixed to the top surface of the rotatable impeller.

Canadian Patent No. 1,293,234 issued 1987/06/08 to E. Karg, provided a device for chopping up garden waste. The patented device included a housing including at least one ejector opening, the housing defining a chamber and having a floor which defined part of the chamber. A plurality of support legs mounted the housing. A motor was mounted to the floor of the housing, the motor having an output shaft which extended into the chamber. A carrier disk was mounted in the chamber to the output shaft to rotate in the chamber, the carrier disk having a deflector mounted at its centre and at least one slot formed therein, each slot defining a trailing edge. Means were mounted to the housing and defined a charging passage arranged over and extending upward from the carrier disk, the carrier disk shutting off the charging passage at one end thereof. The charging passage defined means having at least one inward protrusion, extending transversely in relation to the direction of rotation of the carrier disk, thereby defining a stationary support bolster for supporting the material being chopped. At least one knife was mounted to the carrier disk and extended in a generally radial direction, each knife having an edge aligned with the trailing edge of an associated slot. The number of ejector openings was equal to the number of stationary support bolsters. An axis of the knife extended perpendicularly from the area of each ejector opening was generally perpendicular to the surface defining its respective stationary support bolsters. The chopping device is described as a carrier disk having a centrally-located deflector member mounted thereon. The deflector member is in the form of a spur-bearing shape with a number of spurs on its circumference. These spurs ensure a vigorous stirring action at the centre of the carrier disk so that material fed into the charging passage is reliably and systematically-flung radially outwards into the path of the knife.

SUMMARY OF THE INVENTION

Aims of the Invention

It is readily apparent that none of the above patents provided a machine of exceptionally simple and inexpensive construction that could disintegrate hazardous light bulbs and retain such material in a convenient container for environmentally-safe disposal.

Accordingly, it is one object of this invention to provide a portable machine for the safe disintegration of light bulbs.

Another object of this invention is to provide a portable such disposal unit, which will effectively disintegrate fluorescent lamps.

Yet another object of this invention is to provide a portable, relatively light-weight, easily and safely operable such machine.

Still another object of this invention is to provide such a portable machine in which the exhausts therefrom satisfy environmental protection concerns.

STATEMENT OF INVENTION

This invention provides a portable apparatus for disposing of light bulbs, comprising: (a) an open-topped, multi-compartmented container of circular cylindrical cross-section, the container including (i) an upper operating compartment, (ii) an intermediate collection compartment, and (iii) a lower exhaust compartment having an axial inlet and a radial outlet port; (b) a lid hingedly-connected to, and adapted to cover, the top of the container, the lid having an upper surface and a lower surface adapted to be directed toward the upper operating compartment, the lower surface being connected to (iv) an enclosed reduction chamber, the reduction chamber having (v) an axial inlet means for a bulb to be pulverized and (vi) an axial outlet means leading directly to the collection compartment, (vii) an electric motor provided with an on/off switch, the electric motor being disposed within the upper operating compartment, being secured to the reduction chamber and having a drive shaft extending into the reduction chamber, and (viii) a rigid unitary pulverizing blade secured to the drive shaft; (c) a light bulb feed chute extending through the lid and attached thereto, the chute having an inlet opening which is disposed above the upper surface of the lid and an outlet opening which leads to the axial inlet means (v) of the reduction chamber; (d) a disposable pulverized light bulb collection bag selectively disposed within the collection chamber in air-sealed relationship to the axial outlet means of the reduction chamber; (e) a vacuum motor operatively-disposed within the lower exhaust compartment and having an axial inlet at sub-atmospheric pressure connected to an axial outlet from the intermediate collection compartment to draw gases and particulates from the collection compartment into the lower exhaust compartment, the vacuum motor expelling gases into the exhaust compartment at an over-pressure for discharge to the environment.

This invention also provides a portable apparatus for disposing of light bulbs comprising: (a) an open-topped, multi-compartmented container of circular cylindrical cross-section, the container including (i) an upper operating compartment, (ii) an intermediate collection compartment, and (iii) a lower exhaust compartment having an axial inlet and a radial outlet port; (b) a lid hingedly-connected to, and adapted to cover, the top of the container, the lid having an upper surface and a lower surface adapted to be directed toward the upper operating compartment, the lower surface being connected to (iv) an enclosed reduction chamber, the reduction chamber having (v) an axial inlet means for a bulb to be pulverized and (vi) an axial outlet means leading directly to the collection compartment, (vii) an electric motor provided with an on/off switch, the electric motor being disposed within the upper operating compartment, being secured to the reduction chamber and having a drive shaft extending into the reduction chamber, and (viii) a rigid unitary pulverizing blade secured to the drive shaft; (c) a light bulb feed chute extending through the lid and attached thereto, the chute having an inlet opening which is disposed above the upper surface of the lid and an outlet opening which leads to the axial inlet means (v) of the reduction chamber; (d) a disposable pulverized light bulb collection bag selectively disposed within the collection chamber in air-sealed relationship to the axial outlet means of the reduction chamber; (e) a vacuum motor operatively-disposed within the lower exhaust compartment and having an axial inlet at sub-atmospheric pressure connected to an axial outlet from the intermediate collection compartment to draw gases and particulates from the collection compartment into the lower exhaust compartment, the vacuum motor expelling gases into the exhaust compartment at an over-pressure; and (f) a gas absorption filter disposed within the lower exhaust compartment, the gas absorption filter having an inlet communicating with the lower exhaust compartment and having an outlet communicating with the axial outlet from the lower exhaust compartment, thereby to discharge filtered innocuous gases from the lower compartment to the environment.

OTHER FEATURES OF THE INVENTION

By one feature of this invention, the light bulbs are straight circular, elongated fluorescent lamp tubes, and the feed chute is of circular cylindrical configuration for feeding a fluorescent lamp tube into the container, the chute having an inside diameter adapted closely to accommodate the fluorescent tubes.

By another feature of this invention, the apparatus includes an electrical safety switch pendently supported by the lower surface of the lid and adapted to inactivate the motor switch when the lid is raised from the open-topped container.

By yet another feature of this invention, the light bulb feed chute is removably sealingly secured to the lid.

By still another feature of this invention, the reduction chamber includes an upper cylindrical portion, an intermediate frusto-conical portion, and a lower cylindrical outlet tube, terminating in an angled cut-off providing a peripheral-pointed end.

By a still further feature of this invention, the rigid, bulb-disintegration blade comprises a central hub portion secured to the motor shaft, and at least two rigid blades extending outwardly and upwardly at an angle of about 45° to the central hub portion.

By yet a further feature of this invention, the disposable collection bag includes an upper top cylindrical member having a portion formed of elastically-deformable material having a slit therein, whereby the peripheral-pointed end of the outlet tube from the reduction chamber is sealingly secured to the disposable collection bag.

By yet another feature of this invention, the gas absorption filter is removably disposed within a cylindrical member having perforated cylindrical walls secured in a transverse direction to the axial outlet from the lower exhaust compartment.

BRIEF DESCRIPTION OF THE DRAWINGS

In the accompanying drawings.

DESCRIPTION OF PREFERRED EMBODIMENTS (i). Description of FIG. 1

Figure 1:
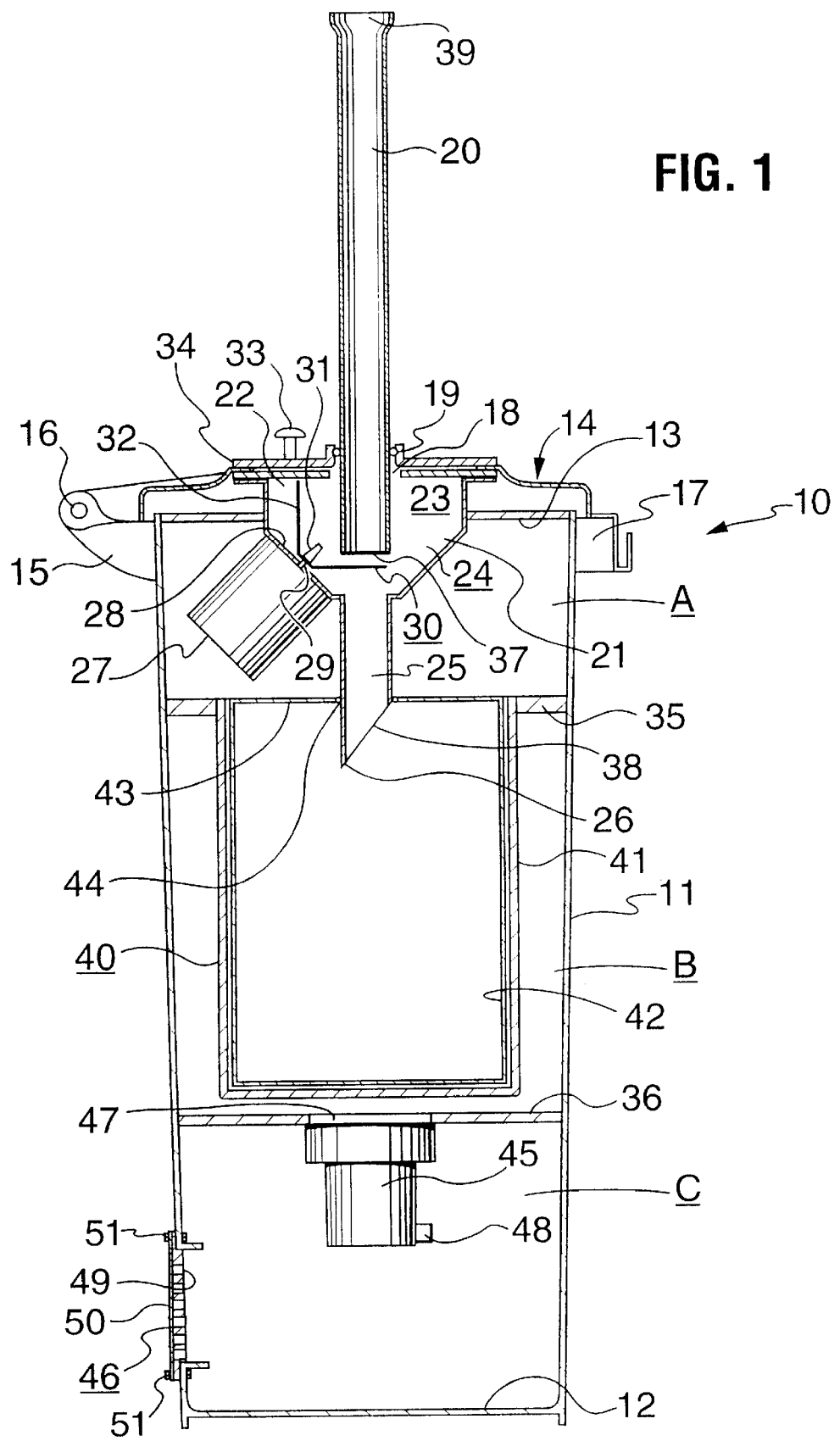
FIG. 1 is a central longitudinal, cross-section through one embodiment of the present invention.

As seen in FIG. 1, the present invention provides a bulb crusher 10 including a main container 11 which is a structurally rigid unit which may be either cylindrical or inverted, slightly frusto-conical. The main container 11 has a flat base 12 and an open-top 13, which is closed by a cover, indicated generally as 14, which is hinged to ear 15 at pin 16 and is sealingly locked in position by clasp 17.

The cover 14 is provided with a central aperture 18, which is surrounded by a flexible sealing ring 19, by means of which is a cylindrical bulb feeder tube 20 is removably attached to the cover 14. The cover 14 also includes a depending, funnel-shaped chamber 21 secured to the under-face 22 of the cover 14. The chamber 21 includes an upper cylindrical portion 23, a mid frusto-conical portion 24, and a lower exhaust tube 25 having an oblique cut-off end to provide a peripheral point 26.

An electric motor 27 is secured to a lower face 28 of the frusto-conical portion 23, the electric motor 27 including a drive shaft 29 projecting through face 28. Secured to the drive shaft 29 is a rigid, bulb disintegration blade 30. Blade 30 includes a central hub portion 31 secured to shaft 29 and at least two blades 32 which extends at an angle of about 45° to the central hub portion. A motor control switch 33 is mounted on the upper surface 34 of the cover 14. Thus, the cover 14, when raised by pivoting, allows free access to the interior of the main container 11.

The main container 11 is divided by an upper perforate or otherwise air pervious annular ring 35, and a lower imperforate annular ring 36 into an upper operating compartment A, an intermediate collection compartment B and a lower exhaust compartment C.

The upper operating compartment A accommodates the elements which have been previously described depending from the cover 14. Thus, the upper operating chamber A accommodates the reduction chamber 21, which has an axial inlet 37 provided by the exit from tube 20 for a bulb to be pilverized. The reduction chamber 21 includes an axial exhaust tube 25. An axial outlet 38 of the exhaust tube 25 leads directly to the vessel 41 of the intermediate collection chamber B. The electric motor 27, which is provided with an on/off switch 33, is secured to the reduction chamber 21. Electric motor 27 has shaft 29 extending into reduction chamber 21. The rigid unitary pulverizing blade 30 is secured to the shaft 29.

Thus, the light bulb feed chute 20 extends through the cover 14 and is detachably attached thereto. The chute 20 has an inlet opening 39 disposed above the upper surface of the cover. The outlet opening 37 is disposed below the lower surface of the lid and is within the reduction chamber 21.

Intermediate collector compartment B accommodates a pulverized bulb collection facility 40. Such facility 40 is provided by a rigid imperforate, open-topped cylindrical vessel 41. A collection bag 42 is fitted within vessel 41. Collector bag 42 is preferably of the type which includes an upper cylindrical top member 43, which is provided with an aperture 44 defined by an elastically-deformable ring 43 provided with a transverse slit therethrough. Thus, the end 38 of exhaust tube 25 is inserted by means of peripheral point 26 through the slit in the ring 43. In this way there is an hermetic seal between the reduction chamber 21 and the interior of the collection bag 42.

Thus, the disposable pulverized light bulb collection bag 42 is disposed within the intermediate collector compartment B in air-sealed relationship to the axial outlet 38 from the reduction chamber 21.

The lower exhaust compartment C accommodates a vacuum motor 45 and a vent system 46. Vacuum motor 45 includes an axial inlet 47, connected at sub-atmospheric pressure directly to the interior of the intermediate collector compartment B, and a radial outlet 48 communicating with the interior of lower exhaust compartment C to expel gases thereinto at an overpressure. Lower exhaust compartment C has a perforate radial outlet 49. The radial outlet 49 is covered by a screen plate 50, removably held thereto by bolts 51. Thus, the vacuum motor 45 is operative-disposed within the lower exhaust compartment C. It has an axial inlet 47 connected at sub-atmospheric pressure to the axial outlet from the intermediate collection chamber B.

(ii). Description of FIG. 2

Figure 2:
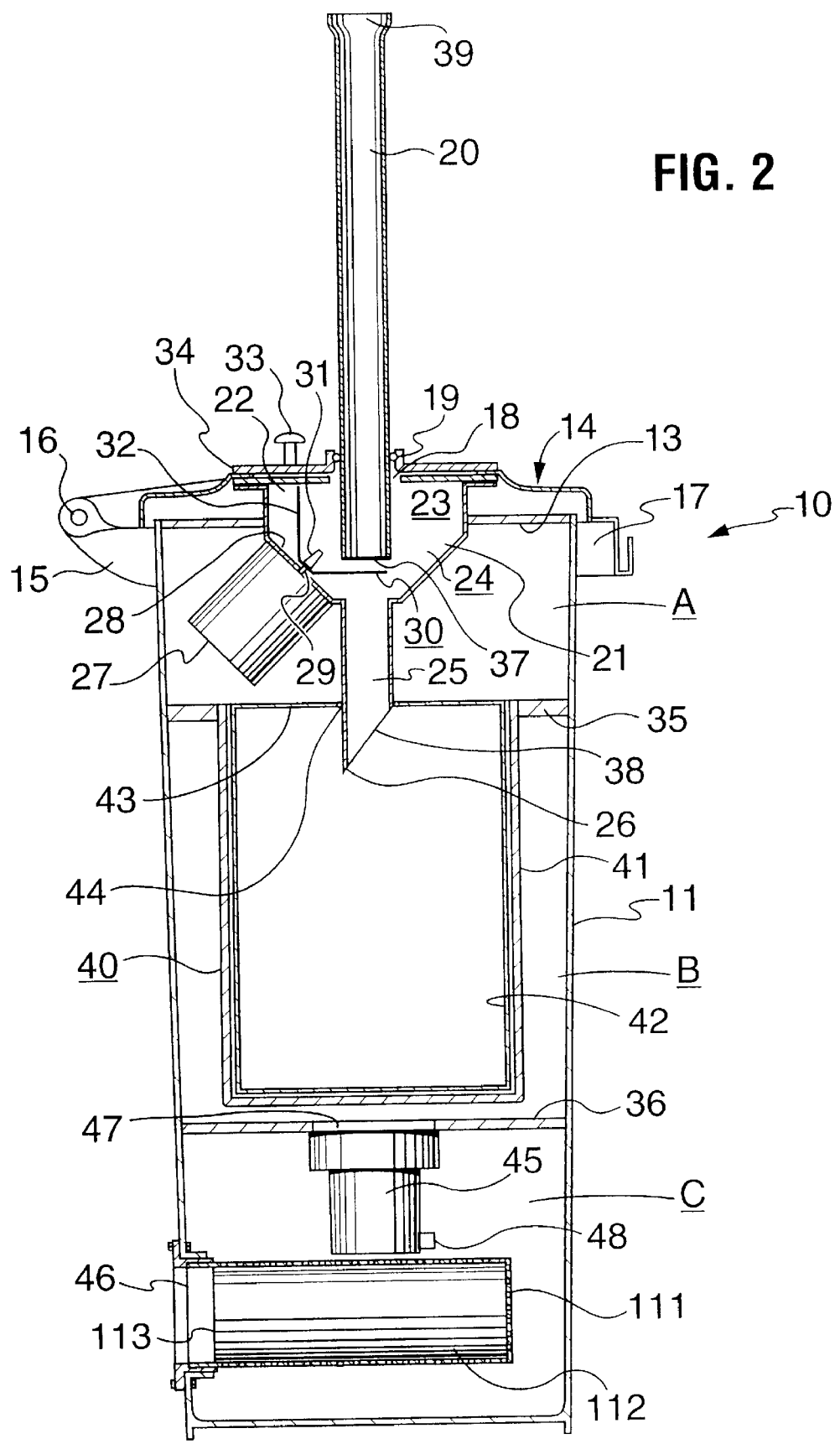
FIG. 2 is a central longitudinal, cross-section through a second embodiment of the present invention.

The second embodiment of the invention shown in FIG. 2 is a bulb crusher 110 which is identical in structure in its major elements. Where identical elements are present in FIG. 2, they will not be described further.

The major difference is that the lower exhaust compartment C is provided with a perforated hollow cylinder 111 fitted to the radial outlet 48 (instead of the screen plate 50). The perforated hollow cylinder 111 extends into the interior of the lower exhaust compartment C. A removable cylindrical charcoal filter element 112 is disposed within cylinder 111. This serves to absorb any (very minor) amount of pollutants which may be present.

Thus, a gas absorption filter 112 is disposed within the lower exhaust compartment C, such gas absorption filter 112 having an inlet 113 through 111 communicating with the lower exhaust compartment C and has an outlet communicating with the radial outlet 46 from the lower exhaust compartment C. This enables the exhausting of filtered innocuous gases from the lower exhaust compartment C.

Operation of Preferred Embodiments (i). Operation of First Embodiment of FIG. 1

In use, the fluorescent tube is fed into the bulb crusher 10 through feeder tube 20. It is crushed by the disintegration blade 30, and is discharged directly into the collection bag 42. During operation, as the portion of a fluorescent tube exits from the outlet 37 of inlet tube 20, it is broken and ground by the novel crushing blades 30 of an aspect of this invention. The unbroken portion of the fluorescent tube moves downwardly through the inlet chute 20 until the entire fluorescent tube is broken and deposited in the disposable collection bag 39.

The lower vacuum chamber serves to draw gases and particulates from the intermediate collection compartment into the lower exhaust compartment and clean exhaust is discharged through the radial outlet.

(ii). Operation of Second Embodiment of FIGS. 2

In use, the fluorescent tube is fed into the bulb crusher 10 through feeder tube 20. It is crushed by the disintegration blade 30, and is discharged directly into the collection bag 42. Because the outlet from the disintegrating chamber 21 is hermetically sealingly secured to the inlet to the dispersible collection bag 42, no significant amount of noxious fumes escape to the radial outlet 46. However, to assure uniform flow of gases within the bulb crusher, a vacuum motor generates suction within the upper operating compartment A, the intermediate collection compartment B, and the lower exhaust compartment C. The suction created by the suction motor expels gases at an overpressure to the lower exhaust compartment. This overpressure expels gases through the radial outlet 46.

A charcoal filter 112 is disposed in the lower exhaust chamber C to communicate with the radial outlet 46.

The lower vacuum chamber serves to draw gases and particulates from the intermediate collection compartment into the lower exhaust compartment and clean exhaust is discharged through the radial outlet. In addition, the presence of the charcoal filter serves to expel filtered innocuous gases through the charcoal filter and thence to the environment.

OTHER VARIATIONS OF THE INVENTION

As described above, the present invention includes, as an essential feature, a particular bulb crusher means. In accordance with the present invention, the crusher means comprises at least two equi-angularly-disposed rigid blades projecting at a 45° angle from a central bulb. The improved crusher means tend to increase the efficiency with which the lamps are crushed or shattered upon entering the holding unit. Because of the enhanced impact of the rigid, 45° angled blade contacting the bulb at 90° to the downward movement of the tube, the tubes are broken rapidly into small particles. As a side effect of such rapid breakup, any undesirable backup into an inlet means is minimized and the ground glass and other residue is impelled forcefully into the disposable collection bag.

A conventional 110 v. plug provides electric power to the motor 27.

Variations can be made in the above-described preferred embodiment, as will be understood by one skilled in the art. The motor, the inlet chute, and the switch can, of course, be mounted to the lid in other arrangements than that specifically shown. The motor can be other than electric, e.g., pneumatic or hydraulic. The inlet chute can be a single tube. Alternatively, the inlet chute can comprise two separate tubes, if desired. Other types of glass (or other material) tubes than fluorescent tubes can also, of course, be disposed of by the apparatus of the present invention, by suitable modification tot he tube inlet means.

The disposal apparatus of the present invention is preferably entirely mounted on the lid of a mating, open-top container. The term "mating" as used herein means that the lid fits on the container and completely and sealing covers the container opening.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. A portable unitary device for disposing of light bulbs, comprising:
   (a) an open-topped, multi-compartmented container of circular cylindrical cross-section, said container including (i) an upper operating compartment, (ii) an intermediate collection compartment, and (iii) a lower exhaust compartment having an axial inlet and a radial outlet port;
   (b) a lid hingedly-connected to, and adapted to cover, the top of said container, said lid having an upper surface, and a lower surface adapted to be directed toward said upper operating compartment, said lower surface being connected to (iv) an enclosed reduction chamber, said reduction chamber having (v) an axial inlet means for a bulb to be pulverized and (vi) an axial outlet means leading directly to said collection compartment, (vii) an electric motor provided with an on/off switch said electric motor being disposed within said upper operating compartment, being secured to said reduction chamber and having a drive shaft extending into said reduction chamber, and (viii) a rigid unitary pulverizing blade secured to said drive shaft;
   (c) a light bulb feed chute extending through said lid and attached thereto, said chute having an inlet opening which is disposed above the upper surface of said lid and an outlet opening which leads to said axial inlet means (v) of said reduction chamber (iv);
   (d) a disposable pulverized light bulb collection bag selectively disposed within said collection compartment in air-sealed relationship to said axial outlet means of said reduction chamber; and
   (e) a vacuum motor operatively-disposed within said lower exhaust chamber and having an axial inlet connected at sub-atmospheric pressure to an axial outlet from said intermediate collection compartment to draw gases and particulates from said collection compartment into said lower exhaust compartment, said vacuum motor expelling gases into said exhaust compartment at an overpressure, for discharge to the environment.

2. The apparatus of claim 1 wherein said light bulb feed chute is removably sealingly secured to said lid.

3. The apparatus of claim 1 wherein said reduction chamber includes an upper cylindrical portion, an intermediate frusto-conical portion, and a lower cylindrical outlet tube, terminating in an angled cut-off providing a peripheral-pointed end.

4. The apparatus of claim 1 wherein said rigid, bulb-disintegration blade comprises a central hub portion secured to the motor shaft, and having at least two rigid blades extending outwardly and upwardly at an angle of about 45° to the central hub portion.

5. The apparatus of claim 1 wherein said disposable collection bag includes an upper top cylindrical member having a portion formed of elastically-deformable material having a slit therein, whereby the peripheral-pointed end of the outlet tube from the reduction chamber is sealingly secured to the disposable collection bag.

6. The apparatus of claim 1 wherein the light bulbs are straight circular, elongated fluorescent lamp tubes, and the feed chute is of circular cylindrical configuration for feeding a fluorescent lamp tube into the container, the chute having an inside diameter adapted closely to accommodate the fluorescent tubes.

7. The apparatus of claim 1 including an electrical safety switch pendently supported by the lower surface of the lid and adapted to inactivate the motor switch when the lid is raised from the open-topped container.

8. A portable unitary device for disposing of light bulbs, comprising:
   (a) an open-topped, multi-compartmented container of circular cylindrical cross-section, said container including (i) an upper operating compartment, (ii) an intermediate collection compartment, and (iii) a lower exhaust compartment having an axial inlet and a radial outlet port;
   (b) a lid hingedly-connected to, and adapted to cover, the top of said container, said lid having an upper surface, and a lower surface adapted to be directed toward said upper operating compartment, said lower surface being connected to (iv) an enclosed reduction chamber, said reduction chamber having (v) an axial inlet means for a bulb to be pulverized and (vi) an axial outlet means leading directly to said collection compartment, (vii) an electric motor provided with an on/off switch, said electric motor being disposed within said upper operating compartment, being secured to said reduction chamber and having a drive shaft extending into said reduction chamber, and (viii) a rigid unitary pulverizing blade secured to said drive shaft;
   (c) a light bulb feed chute extending through said lid and attached thereto, said chute having an inlet opening which is disposed above the upper surface of said lid and an outlet opening which leads to said axial inlet means (v) of said reduction chamber;
   (d) a disposable pulverized light bulb collection bag selectively-disposed within said collection compartment in air-sealed relationship to said axial outlet means of said reduction chamber;
   (e) a vacuum motor operatively-disposed within said lower exhaust chamber and having an axial inlet connected at sub-atmospheric pressure to an axial outlet from said intermediate collection compartment to draw gases and particulates from said collection compartment into said lower exhaust compartment, said vacuum motor expelling gases into said exhaust compartment at an overpressure; and (f) a gas absorption filter disposed within said lower exhaust compartment, and said gas absorption filter having an inlet communicating with said lower exhaust compartment and having an outlet communicating with said axial outlet from said lower exhaust compartment, thereby to exhaust filtered innocuous gases from said lower compartment to the environment.

9. The apparatus of claim 8 wherein said light bulb feed chute is removably sealingly secured to said lid.

10. The apparatus of claim 8 wherein said reduction chamber includes an upper cylindrical portion, an intermediate frusto-conical portion, and a lower cylindrical outlet tube, terminating in an angled cut-off providing a peripheral-pointed end.

11. The apparatus of claim 8 wherein said rigid, bulb-disintegration blade comprises a central hub portion secured to the motor shaft, and having at least two rigid blades extending outwardly and upwardly at an angle of about 45° to the central hub portion.

12. The apparatus of claim 8 wherein said disposable collection bag includes an upper top cylindrical member having a portion formed of elastically-deformable material having a slit therein, whereby the peripheral-pointed end of the outlet tube from the reduction chamber is sealingly secured to the disposable collection bag.

13. The apparatus of claim 8 wherein the light bulbs are straight circular, elongated fluorescent lamp tubes, and the feed chute is of circular cylindrical configuration for feeding a fluorescent lamp tube into the container, the chute having an inside diameter adapted closely to accommodate the fluorescent tubes.

14. The apparatus of claim 8 including an electrical safety switch pendently supported by the lower surface of the lid and adapted to inactivate the motor switch when the lid is raised from the open-topped container.

15. The apparatus of claim 8 wherein said gas absorption filter is removably disposed within a cylindrical member having perforated walls secured in a transverse direction to the axial outlet from the lower exhaust compartment.

* * * * *